United States Patent [19]
Walker

[11] 3,889,118
[45] June 10, 1975

[54] ELECTRONIC PRESENCE SENSING DEVICE

[75] Inventor: Edward J. Walker, Pittsburgh, Pa.

[73] Assignee: Rockwell International Corporation, Pittsburgh, Pa.

[22] Filed: Apr. 18, 1974

[21] Appl. No.: 462,168

Related U.S. Application Data

[63] Continuation of Ser. No. 370,160, June 14, 1973, abandoned.

[52] U.S. Cl. ................. 250/341; 250/221; 250/338
[51] Int. Cl. .............................................. H01j 1/00
[58] Field of Search ........... 250/330, 336, 338, 341, 250/342, 221

[56] References Cited
UNITED STATES PATENTS

| | | | |
|---|---|---|---|
| 3,524,016 | 8/1970 | Jacobs et al. | 250/330 X |
| 3,723,737 | 3/1973 | Zeldman et al. | 250/338 |
| 3,792,275 | 2/1974 | Leftwich et al. | 250/342 X |

Primary Examiner—Archie R. Borchelt

[57] ABSTRACT

An electronic direction and control device comprising a first electronic circuit means having its input connected to an electrical source, the output of said first electronic circuit means connected to at least one radiation-emitting semiconductor device, said first electronic circuit means adapted to provide electrical energy to said semiconductor device to excite said semiconductor device to produce a radiated signal, said radiated signal defining a radiation screen, a radiation-sensing semiconductor device whose input is adapted to receive said radiated signal, the output of said radiation-sensing semiconductor device connected to a second circuit means, said second circuit means adapted to provide an output signal responsive to the presence or absence of any obstruction in said electronic screen, or responsive to the presence or absence of any ambient radiated energy received by said radiation-sensing semiconductor device.

1 Claim, 4 Drawing Figures

ELECTRONIC PRESENCE SENSING DEVICE

This is a continuation of application Ser. No. 370,160, filed June 14, 1973, now abandoned.

BACKGROUND OF THE INVENTION

The present invention relates to an electronic detection and control device of the type adapted to be responsive to the presence or absence of a physical object within a specified area or responsive to any excessive ambient radiated energy. The present invention relates to an improvement to my invention as set forth in U.S. Pat. No. 3,723,737 issued Mar. 27, 1973.

This type of device has two broad areas of application. One such area may be generally described as providing protection for machine operators. In particular it is important from a safety point of view that the entire body of the operator be clear from a specified area around the machine during certain cycles of the machine. If for example, the machine were a power press, the operator's hands must be removed from the die area of the press while the press is being actuated. To insure that the operator takes this action, safety devices, such as mechanical pull-back devices, have been provided. This type of device is essentially mechanical and is provided with "handcuffs" fitted about the wrists of the operator. The cuffs will automatically remove the operator's hands from the die area during press actuation. If the operator should remove the cuffs from his wrists, the machine will be bypasssed and continue to operator.

Other mechanical devices have been provided but are easily avoided by merely disconnecting a linkage or other part. The motivation for taking such action might result from a "piecework" scheme in which the operator wishes to improve his speed believing that he can "beat" the machine.

Electronic devices have also been used for the protection of machine operators. Photo-electric relays and other comparable devices have been used to sense the interruption of a projected light beam. The interruption of the beams may be caused by the presence of a physical object, such as an operator's hand. This type of device may be associated with systems for stopping the press in response to the presence of the physical object. While these devices have gone part way in protecting the operator, they may also be bypassed by means such as excessive ambient radiated energy. This energy may be accidentally or purposefully introduced to the sensing portion of the device to disrupt its operation. An infrared heater, sunlight, or a strobe light may accidentally cause such disruption of the device while an operator's flashlight may purposefully be used to the same end.

The second broad area of application is the "security" area. The purpose of a device applied to this area would be to sense the presence of a foreign object within a defined area, such as an entrance to a bank vault. A secondary purpose might be to sense the presence of smoke or other types of clouding, such as a steam leak. The above-mentioned electronic devices would be most pertinent to this area and have been found deficient for many of the same related reasons.

SUMMARY OF THE INVENTION

It is, therefore, a primary object of the present invention to provide an electronic detection and control device which is responsive to the presence or absence of any obstruction within a defined area, or responsive to the presence or absence within a defined area of any excessive ambient radiated energy.

It is yet another important object of the present invention to provide an electronic detection and control device that is adapted to be used to control the operation of a power apparatus, such as a power press, whereby it protects the operator from the hazard of coming into contact with the working parts of the apparatus during predetermined operating cycles of the apparatus.

It is still another important object of this invention to provide an electronic detection and control device which will provide a protective signal to an associated apparatus should any of the device's important components or their associated circuits fail as a result of a short or open or should the power source for the device fail.

It is still another object of this invention to provide an electronic detection and control device which is "operator proof" and whose operation will not be disrupted by excessive ambient radiated energy.

It is yet another object of this invention to provide an electronic detection and control device which is adapted to sense the presence of a physical object, such as smoke or steam.

It is still another object of this invention to provide an electronic detection and control device comprising a first electronic circuit means having its input connected to an electrical source, the output of said first electronic circuit means connected to at least one radiation-emitting semiconductor device, said first electronic circuit means adapted to provided electrical energy to said semiconductor device to excite said semiconductor device to produce a radiated signal, said radiated signal defining an electronic screen, a radiation-sensing semiconductor device whose input is adapted to receive said radiated signal, the output of said radiation-sensing semiconductor device connected to a second circuit means, said second circuit means adapted to provide an output signal responsive to the presence or absence of any obstruction in said electronic screen, or responsive to the presence or absence of any ambient radiated energy received by said radiation-sensing semiconductor device.

It is yet another object of the present invention to provide an inexpensive, efficient, effective, compact electronic detection and control device.

These and other objects of the invention, as well as the advantages thereof over the prior art forms, will become apparent from the following detailed description of the attached drawings and are accomplished by means herein described and claimed.

One preferred embodiment of the present invention is shown by way of example in the accompanying drawings and is described in detail without attempting to show all the various forms and modifications in which the invention might be embodied; the invention being measured by the appended claims and not by the details of the specification.

DESCRIPTION OF THE PREFERRED EMBODIMENT

Figure 1:
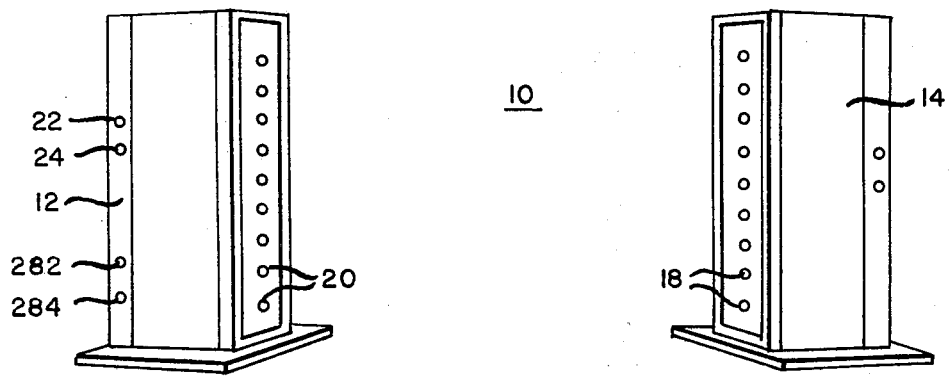
FIG. 1 is a general perspective view of one form of an electronic detection and control device in accordance with the present invention.

Referring now to the drawing and particularly FIG. 1, there is therein shown one form of electronic detection and control device 10 which is adapted to be used in association with a power apparatus such as a press (not shown).

The device 10 may comprise two columns 12 and 14. Column 14 is adapted to house and supoprt an array of radiation diodes 18 which may be spaced on 1.25 inch centers. Column 12 is adapted to house and support an array of phototransistors 20, which may be spaced on 1.25 inch centers.

The radiating diodes, such as infrared diodes 18, are excited with current pulses at a predetermined frequency in a manner to be later explained. The modulated infrared radiation signals emitted by the diodes 18 are thus detected by the array of phototransistors 20. After proper amplification, the signal is transmitted to the associated control circuitry in a manner to be later described. The circuitry is suitably housed in a compact fashion.

The control circuit constantly compares the received signal with the transmitted signal emitted by the diodes 18. Whenever there is a physical obstruction placed between the diodes 18 and phototransistors 20, the received signal differs from the transmitted signal. This situation is detected by the circuitry, which develops a signal which may be used to control an associated apparatus, such as the press. The control could take the form of immediately braking the action of the press by suitable means. Indication lights 22 may be provided to indicate an obstruction, and alarms and other warning devices (not shown) may also be suitably provided.

Additionally, the operation of the device 10 will not be disrupted by stray and excessive ambient radiation. This ambient radiation may be accidentally or purposefully caused. If, for example, should some content of stray radiation manage to fall on the phototransistors 20, the thus generated "ambient" signal will be compared by the circuitry, and the resultant signal will be comparable to the obstruction signal and may be used in the same manner to stop an apparatus, such as the action of a power press. This activity may also be noted by a separate indication light 24.

The device 10 has been so provided to develop a substantially rectangular sensing curtain or screen, but it is obvious that it may be varied depending on application (e.g., protective vs. security; type of machine; type of object being serviced, etc.).

Figure 2:
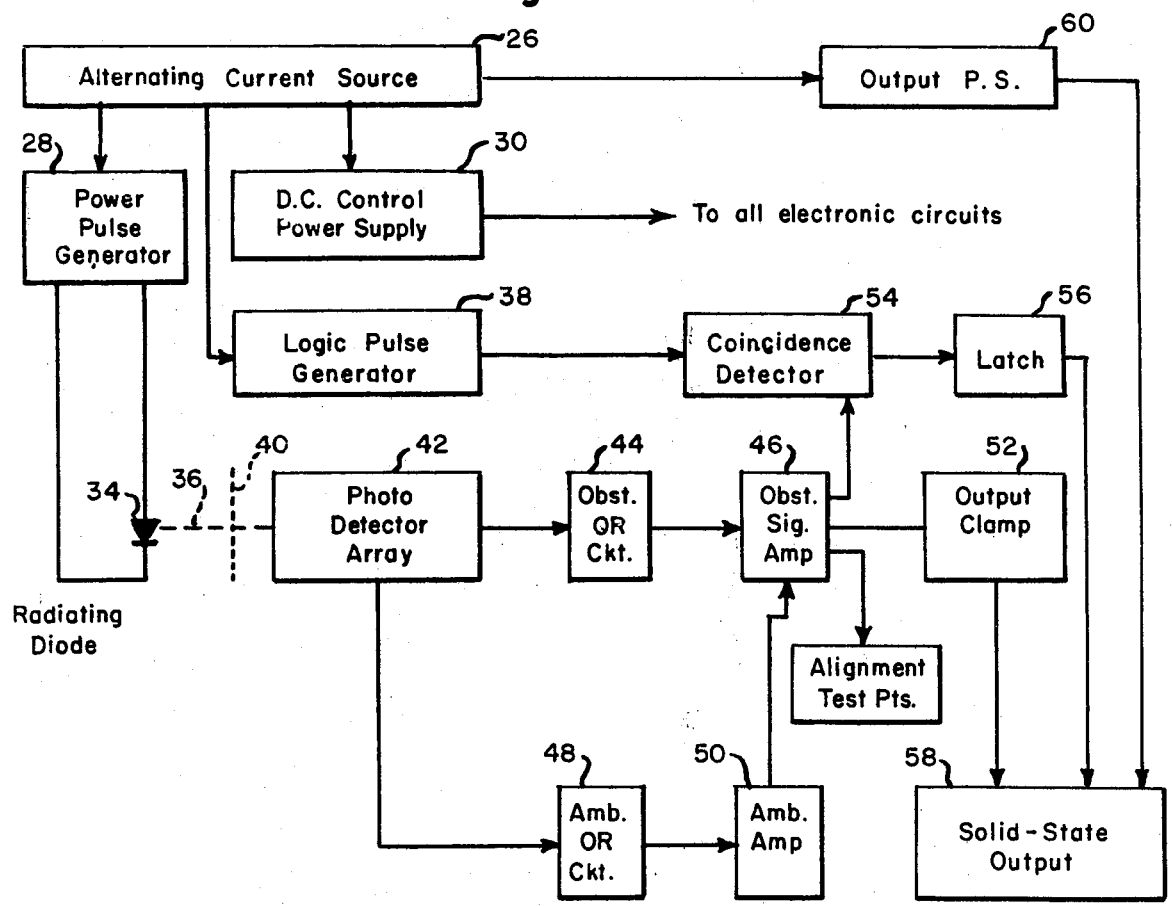
FIG. 2 is a block diagram showing the components in accordance with the invention.

Referring now to FIG. 2, there is therein shown a block diagram showing the components in accordance with the present invention. An alternating current source 26 is connected to a power pulse generator, and controls its pulsing frequency.

The A.C. source 26 is also connected to D.C. control power supply 30 which will provide D.C. power for the associated electronic circuits. The output of the power pulse generator 28 will excite the radiating diodes 34. The diodes 34 may be set in an array of at least one diode and may be typically commercially available gallium arsenide diodes. The diodes 34 will be so driven by the power pulse generator 28, whereby the emitted radiated signal will be in pulsed form. The pulsed signals will thereby form a radiation screen 36.

The A.C. source 26 is also connected to a logic pulse generator 38.

The logic pulse generator 38 transforms the A.C. source 26 into a square wave synchronizing pulse having a predetermined pulse-width time.

The radiation screen 36 passes through a filter 40, which may typically be a commercially available suitable glass or plastic material. The filter 40 filters radiation frequencies different from the band width of the radiation emission frequency of the radiating diodes 34. The radiation screen 36 is then received by photodetector array 42. The detectors which may comprise the array 42 may be typically commercially available phototransistors. In the preferred embodiment, each radiating diode 34 will be in alignment with a corresponding phototransistor.

The received signals pass through an obstruction "OR" logic circuit 44 and are amplified by obstruction signal amplifier 46, and then passed on to the coincidence detection circuit 54. This received amplified signal will normally be a square wave pulse having a pulse width time substantially equal to the transformed synchronizing pulse.

The transformed synchronizing pulse and the transformed received pulse will then be electronically compared in coincidence circuit 54. The output signal of the coincidence circuit 54 will remain at a logic value of zero so long as the synchronizing and received signals are coincident with respect to time. If, however, there should be any physical obstruction in the radiation screen 36, then there would be initially no signal received by that portion of the photodetector array 42 in line with the obstruction. Therefore, there will be an absence of a pulsed signal from the obstruction signal amplifier 46. The output signal of the coincidence circuit 54 will be then at a logic value of one so long as the synchronizing and received signal are not coincident. It should be noted that it is the synchronizing signal that remains constant and provides the measuring base, while the received signal changes according to the presence or absence of an obstruction in the radiation screen 36.

The received signals also pass through an ambient logic "OR" circuit 48 and are amplified by ambient amplifier 50. If there should be excessive ambient radiated energy from a continuous or pulsed or intermittent source, as may be caused by sunlight, flashlight, infrared heater, or strobe-type light source received by the photodetector array 42; photodetector array 42, or any part of array 42, will then be "turned on" accordingly. The ambient amplifier 50 will then feed a clamping signal into the obstruction signal amplifier 46, causing an absence of its pulsed signal output. This causes its output to have a wave form different than the wave form of the synchronizing signal. This difference will then be detected by the coincidence detector circuit 54. The output signal of the coincidence circuit 54 will be then at a logic value of one so long as the synchronizing and received signal lack coincidence. It should also be here noted that it is the synchronizing signal that remains constant and provides the measuring base, while the received signal changes according to the presence or absence of excessive ambient radiated energy introduced into the radiation screen 36.

When the logic value of one is fed into the latch circuit 56 from the coincidence detector circuit 54 the output of the latch circuit 56 will clamp the solid state output circuit 58 to a zero output value.

The received amplified signal from the obstruction signal amplifier 46 is also passed on to the output clamp circuit 52. If there is an absence of the signal pulse from amplifier 46, the clamp circuit 52 will clamp the solid state output circuit 58 to a zero value.

Figure 3:
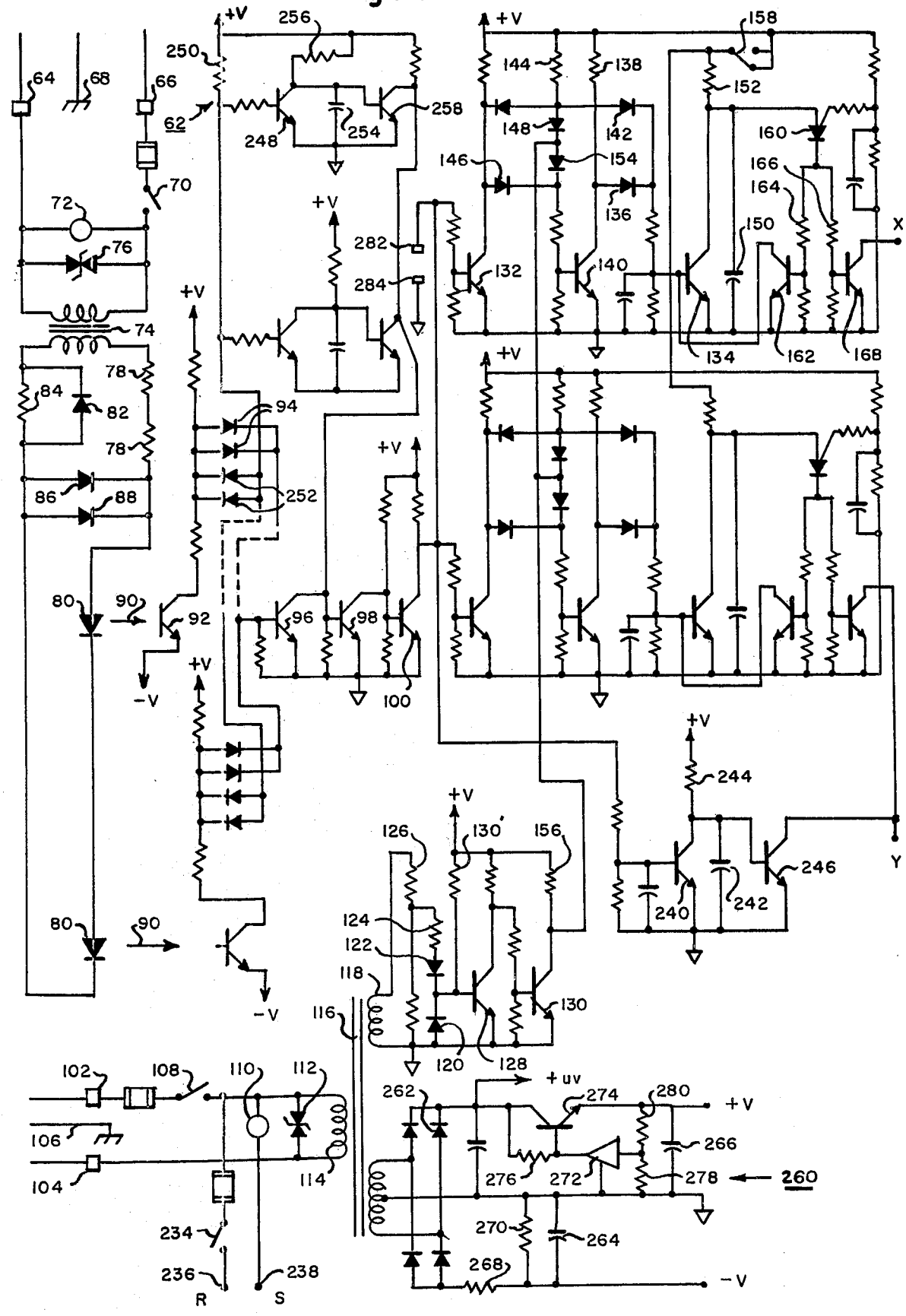
FIGS. 3 and 3a combined comprise a schematic wiring diagram of the system of FIG. 2.
Figure 3A:
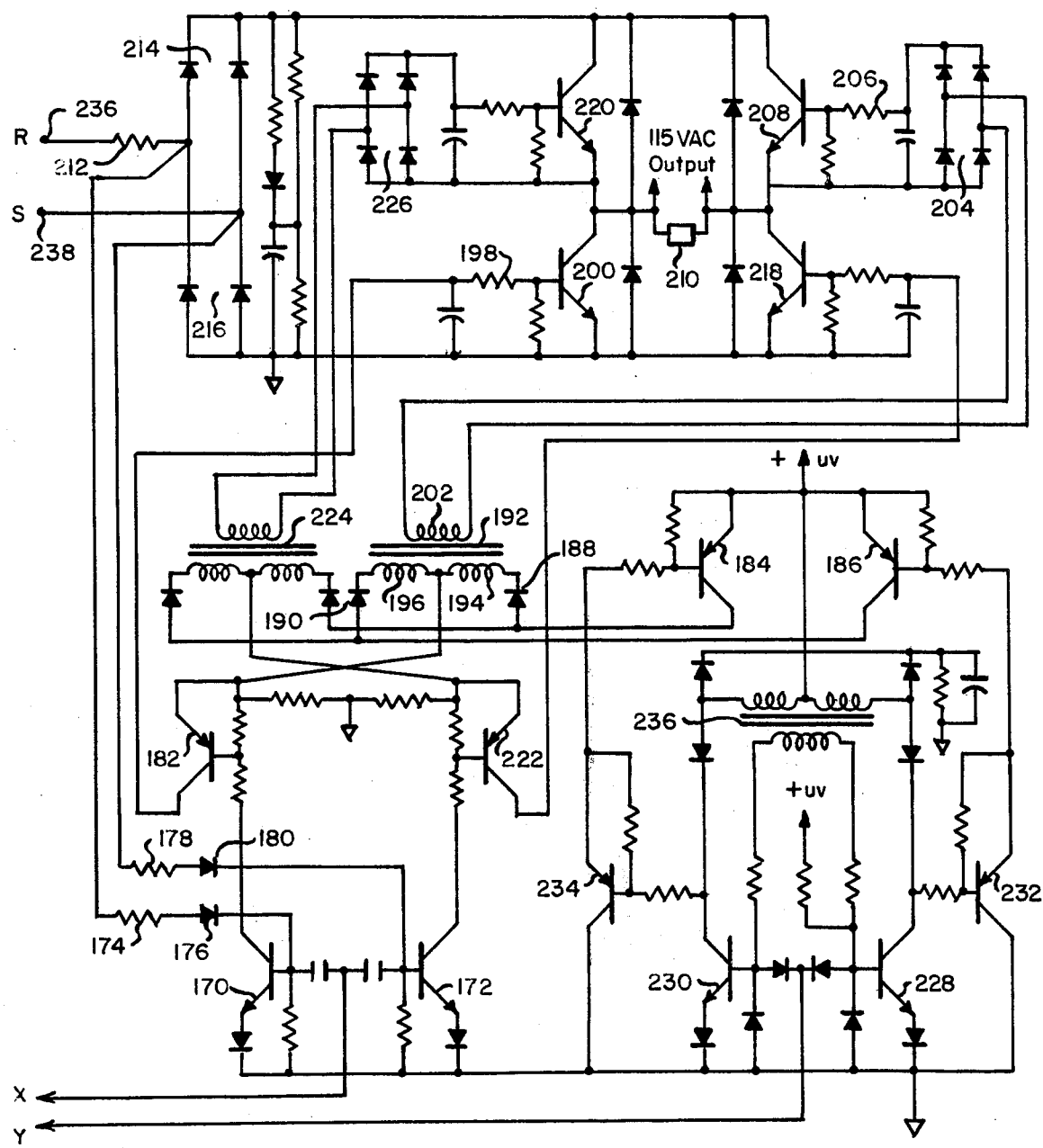

It should also be noted that by so providing an electronic detection and control device, as depicted in FIGS. 1, 2, and 3, which will be later explained, the coincidence electronic circuit 52 will also transmit a signal in response to short or open condition in any important part of the device as well as any failure of the A.C. source 26. This means that upon the occurrence of any of the above-mentioned failures, a signal would be generated to immediately control an apparatus such as a power press.

Now referring to FIG. 3, there is therein shown a specific circuit 62 for controlling a typical power press (not shown) embodying the concepts of the present invention, and having input terminals 64 and 66 and ground terminal 68. Input line voltage is a typical application for 117V AC single phase. Switch 70 contact is switched to apply line power to light 72, to a step down transformer 74 and to a transient voltage suppressor 76.

The secondary winding of transformer 74 provides one half wave of line frequency current through current limiting resistors 78, through the infrared diodes 80, and through diode 82. The next opposite polarity half wave of current will then pass through current limiting resistor 84, diodes 86 and 88 in parallel, and through resistors 78, thus keeping the currents from the transformer balanced on each half cycle to avoid transformer flux saturation. The object of this repeating half wave current function is to pass pulses of current through the infrared diodes 80, which will emit infrared radiation signals when they are so excited. Since the infrared diodes 80 are all pulsed at the same time, and therefore, emit infrared radiation at the same time, they form a curtain or screen 90 of radiation formed at half the line frequency repetition rate.

The transmitted signals are received by the array of phototransistors 92. The received signals pass through the obstruction "OR" logic diodes 94, and are amplified by transistors 96, 98, and 100. This received amplified signal will normally be a square wave pulse having a pulse width time substantially equal to a transformed synchronizing pulse developed as follows.

Input line voltage is also applied to terminals 102 and 104 and terminal 106 is grounded. Switch 108 contact is switched to apply line power to light 110, to a transient voltage suppressor 112, and to the primary wdg 114 of stop down transformer 116. The secondary wdg 118 of transformer 116 will provide one half wave of line frequency current through diode 120, zener diode 122 resistor 124, and resistor 126. This will de-saturate transistor 128 which had been saturated by current flow through resistor 130 and through the base to emitter circuit of transistor 128. The next half wave of opposite polarity current from secondary wdg 118 will help to saturate transistor 128 by passing additional current through resistor 126, resistor 124, zener diode 122, and the base to emitter circuit of transistor 128. Since current will not flow through the zener diode in the back direction until the secondary wdg 118 voltage exceeds the zener breakdown voltage, transistor 128 will be saturated for a longer period of time than it will be de-saturated, resulting in a square wave synchronizing pulse having a predetermined pulse width time substantially equal to the received amplified signal.

The transformed synchronizing pulse and the transformed received pulse will now be compared in a coincidence detection circuit which will function in the following manner:

When the base of transistor 132 receives a logic 1 signal, its collector output signal will be at logic 0 state. Conversely, when there is a 0 signal at the base of transistor 132, its collector output signal will be a 1. Transistor 130 performs in a like manner. Therefore, if the received and the synchronizing signals are both 1, the outputs of transistor 132 and 130 will be 0. The base signal of the transistor 134 will be 1 through diode 136 and resistor 138; therefore, the collector output signal of transistor 134 will be 0. Likewise, if the received and synchronizing signals are both 0, the outputs of transistor 132 and transistor 130 will be 1, the base signal of transistor 140 will be 1 and the collector of transistor 140 will be 0. However, the base signal of transistor 134 will still be 1 through diode 142 and resistor 144; therefore, the collector output signal of transistor 180 will still be 0. Thus, the output of transistor 180 will remain at 0 as long as the synchronizing and received signals are coincident with respect to time.

If an obstruction should appear in the screen 90, then one or more of the obstructed phototransistors 92 will not receive a transmitted signal. There would then be a 0 signal on the base of the associated transistor 92 and the collector of the so effected transistor 92 would be a 1. The base signal then would be a 1 on transistor 96 and its collector output signal would be a 0. (This will be true even though the other signals are received.) Therefore, the base signal of transistor 98 will be a 0 and its collector and the base signal of transistor 100 will be a 1. The collector of transistor 100 remains at 0 during the period of obstruction. At the same time, when the collector signal of transistor 100 goes to 0, the base signal of transistor 132 will also be a 0, causing the collector signal of transistor 132 to be at 1. In this same time interval, the synchronizing signal will appear as a 1 on the base of transistor 130 causing a 0 on the collector of transistor 130. From above, the 1 signal on the collector of transistor 132 will appear as a 1 signal on the base of transistor 140 through diode 146, giving a 0 signal on the collector of transistor 140 and the base of the transistor 134. Also from above, since there will be a 0 signal on the collector of transistor 130, the current will flow through diode 148 to ground, leaving a 0 signal on the base of transistor 134. Since both input signals to the base of transistor 134 are 0, there will be a 1 signal on the collector of transistor 134, which will allow capacitor 150 to charge through resistor 152 and the foot switch reset contacts 158.

(Similarly, if the synchronizing pulse should be missing, then the collector signal on transistor 130 would be a 1. This would appear as a 1 signal on the base of transistor 140 through diode 154 and resistor 156, causing a 0 on the collector of transistor 140 and the base of transistor 134. In this same time interval, the received signal will appear as a 1 signal on the base of transistor 132 which will be a 0 signal on the collector of transistor 132 and also a 0 signal on the base of transistor 134.

This will cause a 1 signal on the collector of transistor 134 which will allow capacitor 150 to charge through resistor 152 and the foot switch reset contacts 158.)

When capacitor 150 charges to the voltage level necessary to overcome the bias voltage of programmable unijunction transistor (PUT) 160, the PUT will turn on and allow current to flow into the base of transistor 162 through resistor 164 and resistor 152. The collector of transistor 162 will then keep a 0 signal applied to the base of transistor 134 which will keep the PUT 160 latched in its conducting state. At the same time current will also flow through the PUT 160 and resistor 152 and resistor 166 and the base of transistor 168. The collector of transistor 168 will then keep a 0 signal applied to the base of transistor 170 and transistor 172. Transistor 170 functions normally to saturate every half cycle of input frequency by current through resistor 174 and diode 176. Transistor 172 functions normally to saturate on the alternate half cycle of input frequency by current through resistor 178 and diode 180. When transistor 170 saturates it allows transistor 182 to saturate. This permits current to flow through the collector emitter circuit of transistor 184, through diode 188, through the primary winding 194 of transformer 192 (and alternately through the collector emitter circuit of transistor 186, through diode 190, through the primary winding 196 of transformer 192), through the collector emitter circuit of transistor 182, through resistor 198, and through the base to emitter circuit of transistor 200. This will saturate transistor 200. The output of pulse transformer 192 will appear as a high frequency square wave voltage on secondary 202. It will be rectified by rectifier 204 which will apply D.C. current through resistor 206 to the base emitter circuit of transistor 208. This will saturate transistor 208. Thus with both transistor 200 and transistor 208 saturated, one half wave of line current will flow through the line switch 108, through the foot switch contact 234, the term R236, resistor 212, diode 214, the collector emitter circuit of transistor 208, the load 210, the collector emitter circuit of transistor 200, diode 216, term S238, and back to line term 104. The alternate half wave of line current will appear in the output load circuit 210 when transistor 218 and transistor 220 are saturated in a similar manner by means of transistor 172, transistor 222, pulse transformer 224, and rectifier 226. The high frequency generator consists of transistors 228, 230, 232, 234, 184, 186, oscillator transformer 236, and associated components. This frequency might be typically 25 hkz. Thus the 0 signal applied to the base of transistor 170 and transistor 172 from the collector of transistor 168 during obstruction will prevent the flow of output current to the load 210 by preventing the saturation of transistors 170 and 172, and thereby preventing the saturation of output transistors 200, 208, 218, and 220.

It should also be noted that transistor 240 will be a 0 signal on its base when there is an obstruction, and the signal on the collector of transistor 100 becomes 0. The collector signal of transistor 240 will then be 1 and capacitor 242 will charge through resistor 244 and will saturate transistor 246 with base current through resistor 244. (When there is no obstruction, the amount of time that the collector signal of transistor 240 is at 1 is not sufficient to charge capacitor 242 to a voltage level sufficient to saturate transistor 246.) The saturation of transistor 246 will keep a 0 signal on the base of transistor 230 and transistor 228, which results in the loss of base drive current for transistors 232, 234, 184, and 186.

This will result in the loss of base drive current for transistors 200, 208, 218, and 220, and therefore, the loss of line current in the output load 210.

An additional important feature of this device is that it is capable of detecting radiated energy from a continuous pulsed or intermittent source that may be introduced within the screen 90. This may occur accidentally a by an infrared heater or strobe-type energy source, or purposely as by a flashlight. This is achieved by the following means. If excessive ambient is received by any of the phototransistors 92, the signal at the base of transistor 248 will be 0 due to current flow through resistor 250, through one or more of the ambient "OR" logic diodes 252, and through the phototransistors 92. Excessive ambient will cause this condition to exist for a sufficient interval of time to allow capacitor 254 to charge through resistor 256 to saturate transistor 258 with base current through resistor 256. (When there is no excessive ambient, the interval of time is not sufficient to charge capacitor 254 to a voltage level sufficient to saturate transistor 258.) The saturation of transistor 258 will keep a 0 signal on the base of transistor 98 as long as there is excessive ambient. The results are the same as those that would appear if there had been an obstruction signal, and operation will be the same as the description given for obstruction detection.

The D.C. power for the control circuits might typically be derived from circuit 260, which consists of a step down transformer 116, a D.C. bridge rectifier 262, filter capacitor 264, filter capacitor 266, filter resistors 268, 270, regulator 272, regulator transistor 274, and regulator resistors 276, 278, 280.

An additional important feature is to provide a circuit which will generate a signal in response to a short or open condition in its important components or associated circuitry as well as in response to any failure to the power supply. For example, if one of the output transistors 200, 208, 218, 220 should fail shorted, a fuse will blow open; resulting in loss of power to the load 210.

Although the above embodiments have been directed to the use of discrete components, it should be understood that other circuit technology could be employed within the scope of the invention. That is, integrated circuits and other similar technology could be used to provide an electronic detection and control device in accordance with this invention.

While certain specific embodiments have been alluded to for the purpose of illustration, it is to be understood that the present invention can be applied to various uses and adaptations that may be made therein, as will be apparent to a person skilled in the art.

An additional important feature is to provide a circuit which will enable the two columns to be easily aligned through the use of test term 282 and test term 284 which provide points whereby maximum signal strength can be easily read by an inexpensive setup voltmeter (0–2.5 VDC).

I claim:

1. An electronic detection and control device compriing a first electronic circuit means having its input connected to an electrical source, the output of said first electronic circuit means connected to at least one radiation-emitting semiconductor device, said first electronic circuit means for providing electrical energy to said semiconductor device to excite said semiconductor device to produce a radiated signal, said radiated signal defining a radiating screen, a radiation sensing semiconductor device whose input receives said radiated signal, the output of said radiation sensing semiconductor device connected to a second circuit means, said second circuit means providing an output signal responsive to the presence or absence of an obstruction in said electronic screen, and responsive to the presence or absence of any ambient radiated energy received by said radiation sensing semiconductor device, said second circuit means providing an output signal responsive to an open or short condition in any of the components or circuits of said device and responsive to any failure of said electrical source, said first circuit means being further provided with a first electronic timing means whose output signal is synchronized with the output of a second electronic timing means, the input of said second electronic timing means being connected to said electrical source, said second circuit means having means to steer the output signal of said radiation-sensing semiconductor device and means to then amplify the steered signal, said second electronic timing means providing an output signal, said third electronic circuit means to electronically compare the time coincidence of the output signals of said second circuit means with the output signal of said second electronic timing means, said first electronic circuit means is a half-wave rectifier pulse generator whose frequency is developed from said electrical source.

* * * * *